Jan. 11, 1944.   C. A. TEA   2,339,036
SPRAY DEVICE
Filed Jan. 16, 1941   2 Sheets-Sheet 2
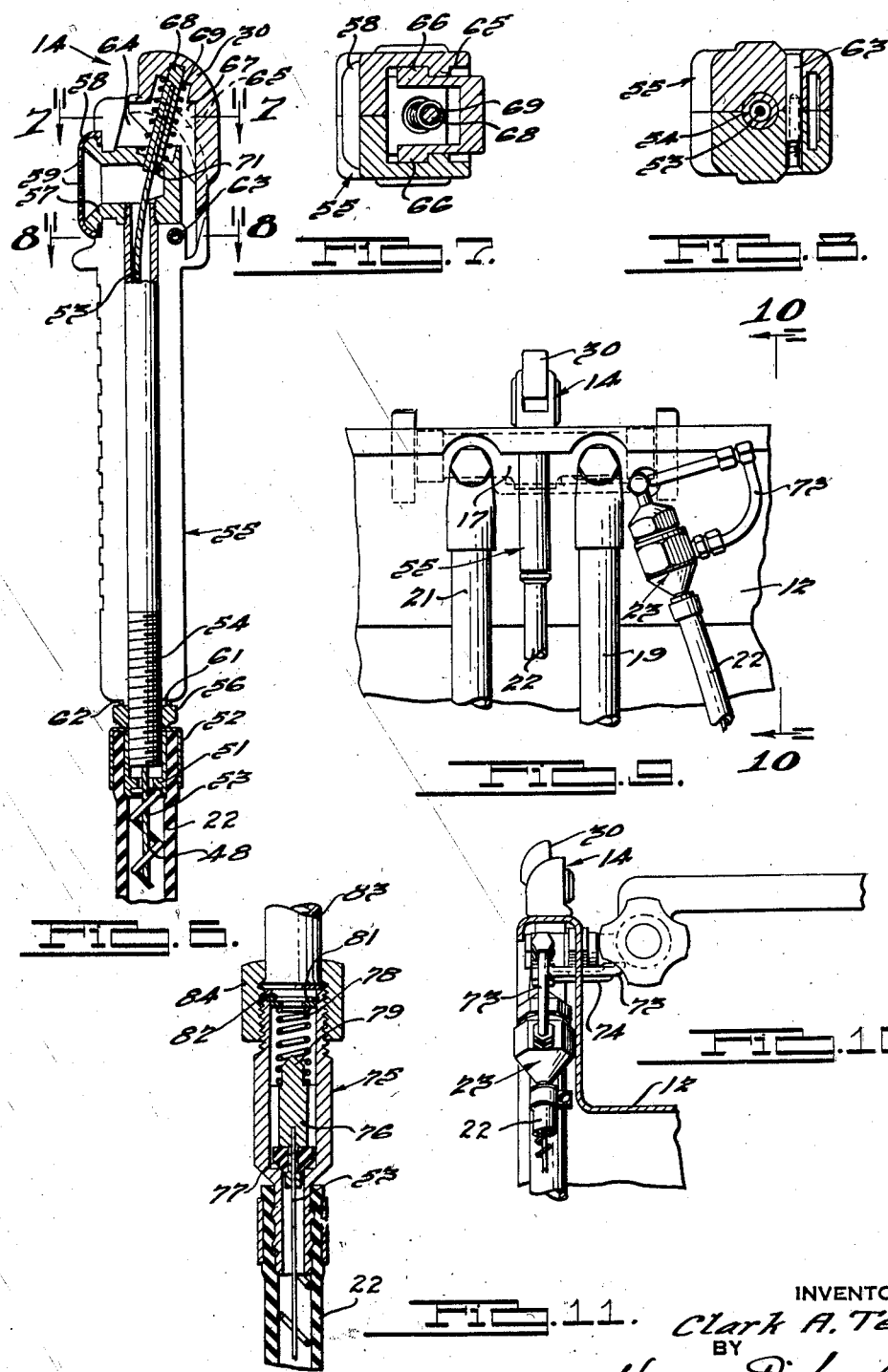
INVENTOR
Clark A. Tea.
BY
Harness, Dickey & Pierce
ATTORNEYS.

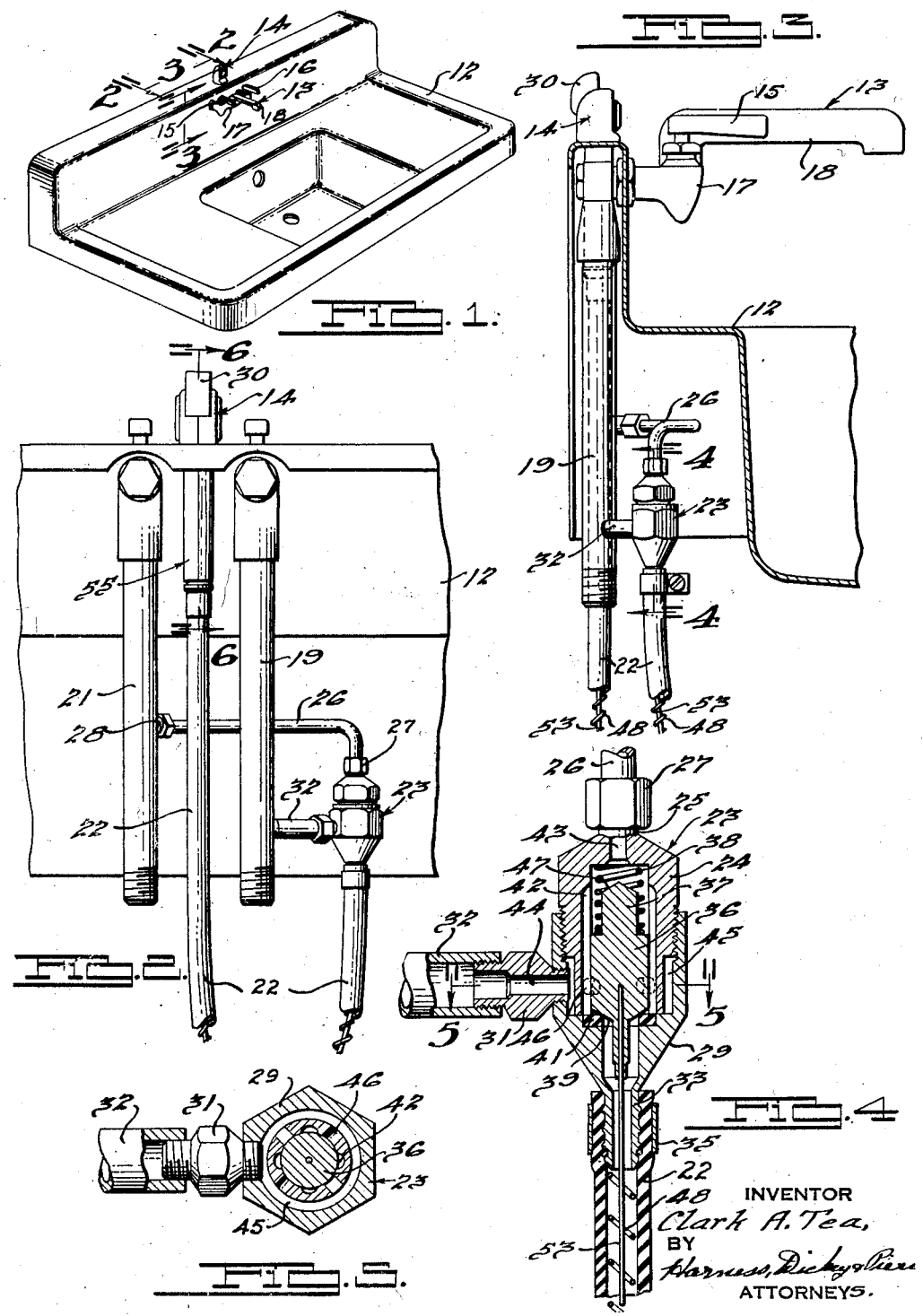

Patented Jan. 11, 1944

2,339,036

UNITED STATES PATENT OFFICE 2,339,036

SPRAY DEVICE

Clark Arthur Tea, Detroit, Mich., assignor to The Murray Corporation of America, Detroit, Mich., a corporation of Delaware Application January 16, 1941, Serial No. 374,667

7 Claims. (Cl. 299—58)

My invention relates to spray nozzles, and particularly to a spray nozzle which is independent of the faucet with which it is associated.

Heretofore it has been the practice to provide a spray nozzle as a part of the faucet by which it was controlled. The mixing valve of the faucet adjusted the temperature of the water which could be directed either through the faucet or the nozzle. A control valve was provided on the faucet for directing the water through either the faucet or the nozzle.

The construction of the faucet and valve parts was expensive, and the control arrangement was objectionable because of the possibility of spraying water from the nozzle when it was the intention of directing the water through the faucet. This often resulted in the spraying of the water on to a person, the wall, floor, or the like, when it was the intention of having the water delivered from the faucet.

In practicing my present invention, I provide a faucet of conventional form, and have associated therewith a spray nozzle which has an independent valve operated from a button on the nozzle end. The valve is connected between the hot and cold water pipes when a mixing valve is employed, or to the hot or cold water pipe when a simple "on" and "off" valve is utilized. A flexible operating element extends through the hose connecting the valve to the nozzle which is movable longitudinally by the button on the nozzle end. The nozzle is entirely independent of the faucet and the mixing of the water is controlled through the pushing of the button a predetermined amount. The further the button is pushed inwardly the higher the temperature of the water will be which is delivered from the nozzle end. Since hot water is usually employed as a spray, it is within the purview of my invention to attach the hose for the nozzle to a simple "on" and "off" valve which is connected directly to the hot water pipe.

Accordingly, the main objects of my invention are: to provide a spray nozzle which is independent of an associated faucet, with an actuating element which controls the flow of water therefrom; to provide a spray nozzle independent of a faucet having an independent mixing valve which is operated by an element on the nozzle end; to provide a spray nozzle for a sink which is independent of a faucet and which has a valve connected to the hot water pipe and controlled by an element on the end of the nozzle; and in general, to provide a spray nozzle for a sink, which is independent of the faucet, and which is simple in construction, positive in operation, and economical of manufacture.

Other objects and features of novelty of my invention will be either specifically pointed out or will become apparent when referring, for a better understanding of my invention, to the following description taken in conjunction with the accompanying drawings, wherein:

Figure 1 is a perspective view of a sink having a spray nozzle embodying features of my invention;

Fig. 2 is an enlarged broken rear view of the splash-board portion of the sink illustrated in Fig. 1;

Fig. 3 is an enlarged sectional view of the structure illustrated in Fig. 1, taken on the line 3—3 thereof;

Fig. 4 is an enlarged sectional view of the structure illustrated in Fig. 3, taken on the line 4—4 thereof;

Fig. 5 is a sectional view of the structure illustrated in Fig. 4, taken on the line 5—5 thereof;

Fig. 6 is an enlarged sectional view of the nozzle illustrated in Figs. 1, 2, and 3;

Fig. 7 is a sectional view of the structure illustrated in Fig. 6, taken on the line 7—7 thereof;

Fig. 8 is a sectional view of the structure illustrated in Fig. 6, taken on the line 8—8 thereof;

Fig. 9 is a view of structure, similar to that illustrated in Fig. 2, showing a modified form of my invention;

Fig. 10 is a sectional view of the structure illustrated in Fig. 9, taken on the line 10—10 thereof; and Fig. 11 is a view of structure, similar to that illustrated in Fig. 4, showing a further form which my invention may assume.

In Fig. 1 I have illustrated a sink 12 of conventional form having a faucet 13 and a spray nozzle 14 which is independent of the faucet. The faucet embodies hot and cold water valves 15 and 16 joined by a manifold 17 from which the water flows through a swingable spout 18. Hot and cold water pipes 19 and 21, respectively, are joined to the faucet in the conventional manner.

The nozzle 14 is connected by a flexible hose 22 to a mixing valve 23 which is operated by a button 39 mounted on the nozzle end. Referring more particularly to Figs. 4 and 5, the valve embodies a tubular body portion 24 on the end 25 of which a conduit 26 is secured by a nut 27, the opposite end of said conduit being secured to a connector 28 which is threaded into the cold water pipe 21. A cap 29 is threaded on to the body portion 24 and this cap has a connector 31 threaded therein and connected to a pipe 32 which is threaded into the hot water pipe 19. The cap 29 has a reduced end portion 33 over which the hose 22 is secured by a ferrule 35.

A piston 36 has a reduced end 37 over which a spring 38 is disposed for forcing the valve seat 39 against a washer 41. Slots 42 are provided on the inner wall of the body 24 communicating with the opening 43 within the inlet end 25 thereof. The passageway 44 within the connector 31 communicates with an annular space 45 provided between the cap 29 and the body portion 24 which communicates with a plurality of apertures 46 disposed in the wall of the body portion.

When the piston 36 is moved upwardly against the spring 38 the valve seat 39 is moved away from the washer 41 and the cold water is free to pass through the slots 42 out of the end 33 of the cap and through the hose 22. As the piston is moved further upwardly against the spring the sloping surface 47 on the end of the projection 37 partially closes the passageway 43 as the apertures 46 are uncovered. As the piston 36 is further moved the cold water supplied through the passage 43 becomes restricted while the flow of hot water through the apertures 46 increases. The water delivered to the hose 22 will become hotter as the piston is moved against the spring until such time as the sloping surface 47 completely seals the passageway 43 when a direct flow of hot water will be delivered to the nozzle. The temperature of the water delivered through the nozzle depends upon the amount of displacement of the piston 36, the temperature increasing as the piston is displaced a greater amount.

Within the flexible tube 22 a helical coil 48 is provided having the coils opened, that is to say, disposed on a steep helix. One end of the coil is secured about the end portion 33 of the cap 29 while the other end is attached to an internally threaded sleeve 51 over which the opposite end of the hose 22 is secured by a ferrule 52. By having the helically wound coil 48 drawn taut when secured at both ends, the helical turns will be prevented from opening when pressure is applied to the operating cable 53 which is guided by the said coil.

In Fig. 6, I have illustrated the nozzle 14 as comprising an inner tube 54 enclosed by an insulating handle 55. The lower end of the tube 54 is threaded into the collar 51 while the opposite end of the tube has a spray head 57 threaded thereon. A sheet of metal 58, having a plurality of openings 59 is flanged over the outlet opening in the spray head 57. The insulating handle 55 is made of two halves and encloses the spray head 57 and the tube 54. A projecting flange 61 on the lower end of the handle 55 is engaged by a flange 62 on the nut 56 which is threaded upon the end of the tube 54 and retains the lower portion of the halves in clamped relation. A threaded cap nut and bolt 63 extend through the upper part of the two halves to clamp them together.

Above the nozzle portion 57, the insulating handle has a hollow portion 64 in which the thumb button 39 is secured for movement therewithin. An arcuate shaped inwardly projecting wall 65 is engaged by arcuate projections 66 on the side of the button which limits its outward movement. The button is hollow at 67 to clear the nozzle element 57 when moved inwardly to valve open position. A stem 68 is threaded in the inner wall of the button and carries a spring 69 disposed between the button and the nozzle element 57 having an opening 71 through which the stem 68 projects.

The operating cable 53 projects into an aperture in the stem 68 and in an aperture in the piston 36, and may be brazed or otherwise securely connected to the piston. The cable is preferably made up of a plurality of wires to provide rigidity while at the same time embodying flexibility to permit the hose to bend. The cable herein illustrated is made up of a central strand of seven wires surrounded by twelve outer wires wound in helical form. The cable is flexible while being sufficiently rigid to be moved longitudinally by a pushing force applied on its end. When the button 39 is pushed inwardly, the operating cable 53 moves longitudinally in the tube 54 and the flexible tubular element 22, while being guided by the helical coil 48, to apply sufficient force to the piston 36 to move it against the spring 38. The piston is moved a desired amount to thereby control the temperature of the water being delivered from the nozzle end.

The initial movement of the piston 36 permits a mixture of hot and cold water to flow from the nozzle 14 while a further deflection of the button and piston will reduce the flow of cold water to increase the temperature of the delivered water. When the piston is moved its maximum amount, the flow of cold water is entirely interrupted and a flow of hot water is then delivered from the nozzle. By adjusting the collar 51 on the stem 54, the length of the flexible tube 22 relative to the operating cable 53 is adjusted so that it will be capable of operating the piston 36 fully when the button 39 is completely depressed. By anchoring the helical coil 48 at both ends, there will be no tendency for the operating cable 53 to stretch the flexible tube 54 and thereby fail to operate the piston 36. The open coil 48 provides open passages for the water which flows freely thereabout within the flexible tube.

In Figs. 2 and 3, I have illustrated the valve 23 as having the delivery conduits 26 and 32 tapped directly into the cold and hot water pipes 19 and 21, respectively. In Figs. 9 and 10, I have illustrated the valve 23 as having the conduits 73 and 74 connected into the manifold 17 of the faucet. Otherwise, the construction is the same as that shown and described relative to Figs. 2 and 3.

In Fig. 11, I have illustrated a further form which my invention may assume; that wherein a valve 75 is employed having a piston 76 which is operated by the cable 53. The piston carries a washer 77 which is urged onto its seat by a spring 78. The spring is maintained in position by a projection 79 on the piston 76, and a washer 81 which is retained in position by a split washer 82. While the valve 75 may be threaded directly into a supply line, I have illustrated a conduit 83 as being sealed to the end of the valve body by a nut 84 and tapped into the hot or cold water supply line. For spraying purposes, it is usually desirable to employ hot water, and for this reason the single valve is preferably employed for controlling the flow of hot water through the nozzle.

It will thus be seen that I have provided a spray nozzle for a sink which is entirely separate from its associated faucet. The construction permits the faucet to be operated while the spray nozzle is being employed. Further novelty resides in the control of the valve by a thumb button on the end of the nozzle by which the temperature of the water delivered from the nozzle is regulated. When a hot water spray is desired a simple "off" and "on" valve may be connected to the hot water supply conduit and operated by the push button on the nozzle.

While I have described and illustrated several embodiments of my invention, it will be apparent to those skilled in the art that various changes, omissions, additions and substitutions may be made therein without departing from the spirit and scope of my invention, as set forth in the accompanying claims.

What I claim is:

1. A spray nozzle embodying a spray head, an actuating element carried by said head, a remotely located mixing valve to which hot and cold water conduits are connected, a hose conductively joining said spray head and valve, and pushable means extending through said hose and connecting the actuating element to said valve whereby the pushing of said last means moves the valve and controls the temperature of the water delivered from the nozzle.

2. A spray nozzle for a sink mounted independent of the faucet thereof which includes, a spray head, an operating element carried by said spray head, a valve connected to a water supply element, a flexible tube conductively joining the valve to the spray head, a flexible coil within said tube, and pushable means within said tube and coil for connecting said operating element to said valve for opening said valve when said means is pushed.

3. A spray nozzle for a sink mounted independent of the faucet thereof which includes, a spray head, an operating element carried by said spray head, a valve connected to a water supply element, a flexible tube conductively joining the valve to the spray head, a flexible coil within said tube secured at its ends to said spray head and valve to prevent the stretching of the tube when said operating element is actuated, and pushable means within said tube and coil for connecting said operating element to said valve.

4. A spray nozzle and valve assembly including, in combination, a longitudinally movable valve portion in said valve assembly which closes off the hot and cold water flow therefrom and which regulates the proportion of hot and cold water delivered, a nozzle portion, a flexible tube having a passageway conductively joining the valve assembly to the nozzle portion, a longitudinally movable element on the nozzle portion, a flexible operating element which forms a longitudinal extension of the movable element connecting the longitudinally movable element to the movable valve portion through the passageway in the flexible tube for positioning said valve when the longitudinally movable element is actuated for delivering a mixture of hot and cold water from the nozzle at a temperature regulated by the degree of movement of the longitudinally movable element and the movable valve portion.

5. A spray nozzle and valve assembly including a longitudinally movable valve portion, a nozzle portion, a flexible tube conductively joining the valve assembly to the nozzle portion, a longitudinally movable element on the nozzle portion, and a flexible operating element movable by a pushing force and which forms a longitudinal extension of said movable element connecting the movable element to the movable valve portion through the flexible tube for pushing said valve when the longitudinally movable element is actuated.

6. A spray nozzle and valve assembly including a longitudinally movable mixing valve, a nozzle portion, a flexible tube conductively joining the valve assembly to the nozzle portion, a longitudinally movable element on the nozzle portion, a flexible operating element movable by a pushing force and which forms a longitudinal extension of said movable element connecting the movable element to the mixing valve through the flexible tube for pushing said mixing valve when the longitudinally movable element is actuated, and an open helical coil within said flexible tube through which the operating element extends for preventing the extension of the tube when the flexible operating element is moved.

7. A spray nozzle and valve assembly including a longitudinally movable valve portion, a nozzle portion, a flexible tube conductively joining the valve to the nozzle portion, a longitudinally movable element on the nozzle portion, a flexible operating element movable by a pushing force and which forms a longitudinal extension of said movable element connecting the movable element to the valve portion through the flexible tube for pushing said valve portion when the longitudinally movable element is actuated, an open helical coil within said flexible tube through which the operating element extends, and means for securing the ends of said helical coil to the nozzle and valve assembly for preventing the extension of the tube when the flexible operating element is moved.

CLARK ARTHUR TEA.